No. 730,629.
PATENTED JUNE 9, 1903.
R. FLEMING.
CONSTANT CURRENT ROTARY CONVERTER.
APPLICATION FILED NOV. 12, 1900.
NO MODEL.
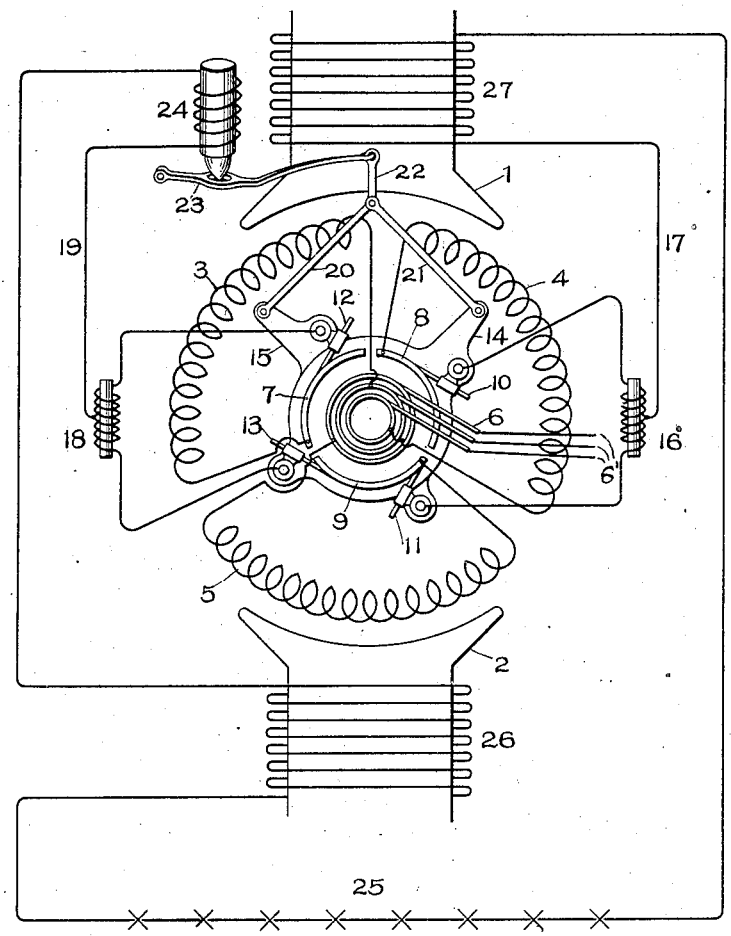
Witnesses
Lewis P. Abell.
Benjamin B. Hull.
Inventor:
Richard Fleming,
by Albert G. Davis,
Atty.

No. 730,629. Patented June 9, 1903.

UNITED STATES PATENT OFFICE.

RICHARD FLEMING, OF SWAMPSCOTT, MASSACHUSETTS, ASSIGNOR TO GENERAL ELECTRIC COMPANY, A CORPORATION OF NEW YORK.

CONSTANT-CURRENT ROTARY CONVERTER.

SPECIFICATION forming part of Letters Patent No. 730,629, dated June 9, 1903.

Application filed November 12, 1900. Serial No. 36,165. (No model.)

*To all whom it may concern:*

Be it known that I, RICHARD FLEMING, a subject of the Queen of Great Britain, residing at Swampscott, in the county of Essex, State of Massachusetts, have invented certain new and useful Improvements in Constant-Current Rotary Converters, of which the following is a specification.

The principal object of the invention herein described is to accomplish the conversion of constant-potential alternating current into direct current of constant volume. To accomplish this result, I have devised a new type of rotary converter which, by reason of certain features of regulation which it possesses, enables me to produce a constant direct current from a source of constant-potential alternating current. This converter differs in some respects radically from the type of converter used for changing constant-potential alternating current to constant-potential direct or the reverse. Thus, for instance, the armature-winding, instead of being continuous, is of the open-coil variety, each coil of the winding being connected at one end to a segment of the commutator, the other ends of the windings being connected, respectively, to collector-rings, through which the windings receive alternating current from a suitable source of supply, though this feature is not inherently essential in the practice of my invention. Another point of distinction is that the brushes which bear upon the commutator, instead of being fixed during normal operation, are moved back and forth in order to vary the electromotive force impressed upon the direct-current circuit, and thereby maintain a constant value of current therein.

A better understanding of my invention will be had by reference to the following description, taken in connection with the accompanying drawing.

The points of novelty of my invention I will particularly set forth in the appended claims.

The drawing represents my invention in diagram.

The field-poles of the converter are shown at 1 and 2. The armature which coöperates with these field-poles is provided in the present instance with three equally-spaced armature-coils 3, 4, and 5, which, by reason of this equal spacing, gives rise to induced electromotive forces having a three-phase relation to each other. The converter is thus suitable for the transformation of three-phase alternating current, this current being supplied over transmission-lines 6' to collector-rings and brushes, indicated generally at 6. The three windings 3, 4, and 5 each have one of their ends connected to one of the three collector-rings, as will readily be seen, the other ends of the windings being connected, respectively, to the three commutator-segments 7, 8, and 9, respectively, of a commutator built with the segments separated from each other by an air-space, as in the commutators usually employed for constant-current machines.

Upon the commutator bear two sets of brushes 10 11 and 12 13, the brushes 10 and 13 being carried by a rocker-arm 14, while the brushes 11 and 12 are similarly mounted on another rocker-arm or brush-carrying ring 15.

The brushes 10 and 11, constituting one set, are electrically connected together through the medium of a self-induction coil 16, into the middle point in the length of which is connected a constant-current main 17. In a similar manner the brushes 12 and 13 are connected together through the medium of a self-induction coil 18, into the middle of which is tapped the constant-current conductor or main 19. The object of these self-induction coils is to prevent too large a flow of current between brushes to which they are connected, thereby materially reducing sparking at the commutator.

In order to produce the desired constant-current regulation, I make use of a magnetically-controlled means for shifting the brushes about the commutator, and thereby adjusting the electromotive force impressed upon the constant-current circuit. The means which I employ for this purpose may differ widely in character without effecting the scope of my invention, since I do not wish to be limited to any particular form of brush-shifting mechanism. I have, however, in the drawing shown one form suitable for obtaining the beneficial results of my invention. As shown, the brush-carrying yokes or rings 14 15 have their projecting ends connected together by two links 20 and 21, which form a sort of toggle-joint, which as the toggle is moved backward and forward produces opposite movements of the yokes 14 and 15 either in one direction or the other, as the case may be. The joint between the links 20 21 is acted upon by a connecting-link 22, which is joined to one end of a magnetically-actuated lever 23, the movement of which is responsive to variations of current in the constant-current circuit. I have shown this lever 23 as acted upon by a magnet 24, the winding of which is directly in series with the constant-current circuit 19. The magnet acts to move the brushes in one direction, while a spring or the weight of the parts may be sufficient to move the brushes in the opposite position. The magnet alone may be used for purposes of operation, or if greater sensitiveness is desired a relay may be used controlling the action of the magnet—such, for example, as is used in connection with the ordinary Thomson-Houston constant-current generator. As these minor features constitute no part of my present invention, I consider a detailed description unnecessary.

In exciting the field of the converter the direct current in the consumption-circuit 25 may be passed through the field-winding 26 and 27. If desired, however, a separate source of excitation may be employed.

In starting the converter the brushes are separated so that the distance between any two is less than the arc spanned by one commutator-segment. The armature-windings are thus connected so as to form a closed circuit, and if supplied with alternating current through the collector-rings will cause the converter to start into operation, the starting of the converter being the same in principle as the starting of the ordinary rotary converter. After the machine is gotten up to speed and the load thrown on the further operation of the machine is automatic.

What I claim as new, and desire to secure by Letters Patent of the United States, is—

1. The combination of a rotary converter provided with collector-rings and a commutator, means for supplying alternating current to said rotary converter, a consumption-circuit connected to brushes on the commutator, and magnetically-controlled means for shifting the brushes on the commutator as the load on the consumption-circuit varies.

2. The combination of a rotary converter, means for supplying said rotary converter with constant-potential alternating current, and means for supplying a variable load with constant current from said rotary converter.

3. The combination of a dynamo-electric machine provided with an armature having an open-coil winding, means for supplying said winding with alternating current, and means for deriving from said armature a constant direct current.

4. The combination of a dynamo-electric machine provided with an armature, means for supplying said armature with a constant-potential alternating current, and means for supplying a consumption-circuit with a constant direct current derived from said armature.

5. The combination of a dynamo-electric machine provided with a commutator and collector-rings, means for supplying constant-potential alternating current to said collector rings, automatic means for shifting the brushes on the commutator, and a circuit fed from said brushes with direct current of constant value.

6. The combination of a dynamo-electric machine provided with a commutator and collector-rings, means for supplying constant-potential alternating current to said collector-rings, automatic means for shifting the brushes on the commutator, and a circuit containing translating devices in series connected to said brushes.

In witness whereof I have hereunto set my hand this 9th day of November, 1900.

RICHARD FLEMING.

Witnesses:
  DUGALD McK. McKILLOP,
  JOHN J. WALKER.